US007366069B2

(12) United States Patent
Kun-Yi

(10) Patent No.: US 7,366,069 B2
(45) Date of Patent: Apr. 29, 2008

(54) AUTO-ADJUSTING SYSTEM FOR AN OPTICAL INCIDENT ANGLE

(75) Inventor: Chan Kun-Yi, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 566 days.

(21) Appl. No.: 11/000,070

(22) Filed: Dec. 1, 2004

(65) Prior Publication Data

US 2006/0114774 A1    Jun. 1, 2006

(30) Foreign Application Priority Data

Dec. 4, 2003   (TW) .............................. 92134259 A

(51) Int. Cl.
*G11B 7/00* (2006.01)
(52) U.S. Cl. ................. 369/53.19; 369/44.32
(58) Field of Classification Search ............. 369/53.19, 369/43.32
See application file for complete search history.

(56) References Cited

U.S. PATENT DOCUMENTS

| | | | |
|---|---|---|---|
| 5,708,646 A | 1/1998 | Furusawa | |
| 5,805,543 A | 9/1998 | Takamine et al. | |
| 5,828,637 A | 10/1998 | Kim | |
| 6,137,754 A | 10/2000 | Furukawa | ................. 369/44.32 |
| 6,363,039 B2 | 3/2002 | Hayashi et al. | |
| 6,430,130 B1 | 8/2002 | Furukawa | |
| 6,459,664 B1 | 10/2002 | Yamada et al. | |
| 6,469,979 B1 | 10/2002 | Joo et al. | |
| 6,549,493 B1 | 4/2003 | Nakamura et al. | |
| 2002/0131347 A1* | 9/2002 | Raaymakers | ............. 369/53.19 |
| 2003/0147314 A1* | 8/2003 | Kondo et al. | ............ 369/53.19 |
| 2005/0024999 A1* | 2/2005 | Hsiao | ...................... 369/53.19 |

FOREIGN PATENT DOCUMENTS

| | | |
|---|---|---|
| JP | 59040327 A2 | 3/1984 |
| JP | 60038743 A2 | 2/1985 |
| JP | 61160844 A2 | 7/1986 |
| JP | 61239440 A2 | 10/1986 |
| JP | 61242346 A2 | 10/1986 |
| JP | 62089246 A2 | 4/1987 |
| JP | 01088931 A2 | 4/1989 |
| JP | 07201055 A2 | 8/1995 |
| JP | 10083549 A2 | 3/1998 |
| JP | 2001143264 A2 | 5/2001 |
| JP | 2001195763 | 7/2001 |
| WO | WO02073609 A1 | 9/2002 |

* cited by examiner

*Primary Examiner*—Thang V. Tran
*Assistant Examiner*—Jorge L. Ortiz-Criado
(74) *Attorney, Agent, or Firm*—Troxell Law Office, PLLC

(57) ABSTRACT

An auto-adjusting system for an optical incident angle comprises a memory, a linear tilt calculation unit, a non-linear tilt calculation unit, a controller, and a tilt actuator. The memory is used for storing a linear tilt compensation table and a non-linear tilt compensation table. The linear tilt calculation unit is used for calculating the corresponding linear tilt dac value by consulting the linear tilt compensation table according to a first radius and a focus output voltage. According to a predetermined comparison procedure, the non-linear tilt calculation unit is used for generating a second radius wherein the compact disc begins to generate non-linear deformation and then obtaining the corresponding non-linear tilt compensation parameter by consulting the non-linear tilt compensation table according to the first radius and the second radius. The controller is used for controlling the pickup head, the memory, the linear tilt calculation unit, and the non-linear tilt calculation unit.

12 Claims, 6 Drawing Sheets

AUTO-ADJUSTING SYSTEM FOR AN OPTICAL INCIDENT ANGLE

BACKGROUND OF THE INVENTION

1. Field of the Invention

The present invention relates to an auto-adjusting system for an optical incident angle, especially to an auto-adjusting system for an optical incident angle applied in an optical information recording/reproducing apparatus, which is used for correcting the inclination of the pickup head on line, so that the laser beam can be kept in a predetermined optical incident angle to read data from the compact disc.

2. Description of the Prior Art

This era is the time of information explosion. As the amount of data increases quickly, the technology of information storage and process is also improving rapidly. The technology of optical information storage is quite important in the related field.

In order to improve the technology of information storage and increase the amount of information storage, the relative technology of optical information recording/reproducing apparatus is developed mainly by speeding up the rotation speed of compact discs and adopting the laser beams with shorter wavelengths. On one hand, the rotation speed of compact disc is increasing day by day; on the other hand, the technology of laser beam is improved from the standard of CD (wavelength is about 780 nm) to the standard of DVD (wavelength is about 650 nm), or even laser with shorter wavelengths, e.g. blue ray. However, how to maintain the optical information recording/reproducing quality is always the problem that needs to be overcome. Therefore, many kinds of technology of servo control are invented.

In the prior art, the technologies of servo control applied in the optical information recording/reproducing apparatus comprise spindle servo, focus servo, tracking servo, and seek servo. These classifications and the functions of all kinds of servo technologies are well-known to those skilled in the art and can be carried out on a controller chip with DSP as the core. The relative technology of the present invention is more about focus servo. The focus servo is used for controlling the pickup head to move in the direction vertical to the compact disc, so that a focus distance is kept between the pickup head and the compact disc. Furthermore, the focus servo can receive the focus error signal (FE signal) reflected from the compact disc and output a focus output voltage (FOSO or FOO) to control the pickup head, so that the FE signal is close to zero. Therefore, the pickup head can still focus on the appropriate position of the compact disc while it is moving. There are many reasons why the pickup head cannot maintain a focus distance with the compact disc; for example, the compact disc is not smooth, or the compact disc wobbles or is deformed while rotating. Under the above conditions, the pickup head must move in a vertical direction to maintain the focus distance with the compact disc. However, as the wavelength of laser beam reduces and the rotation speed of compact disc increases, only maintaining the focus distance between the pickup head and the compact disc automatically is still not enough to keep a consistent quality for the optical information recording/reproducing system.

The reason that leads to the above disadvantages of the prior art is due to the fact that the laser beam cannot be orthogonal to the compact disc while the laser beam is focused on the compact disc. In the process of designing the optical information recording/reproducing apparatus, the above condition is not part of the consideration; only the offset of focus distance caused by wobbling or deformation, while the compact disc rotates, is being considered. In other words, although the technology of focus servo enables the pickup head to maintain the focus distance with the compact disc, whether the laser beam is orthogonal to the compact disc cannot be guaranteed. Therefore, the quality of the obtained signal will be lowered.

Please refer to FIG. 1. FIG. 1 is a schematic diagram of the relative position between an optical information recording/reproducing apparatus 10 and an optical disc 14 of the prior art. The optical information recording/reproducing apparatus 10 of the prior art comprises a rotation device 12, a pickup head track 16, and a pickup head 18. The rotation device 12, the compact disc 14, the pickup head track 16, and the pickup head 18 respectively have an adjustable inclination device to adjust the corresponding inclination of a spindle 22, a disc spindle 24, a pickup head track spindle 26, and a mirror spindle 28. Taking the rotation device 12 as an example, three inclination adjusting screws 29 are set thereon. If the spindle 22, the disc spindle 24, the pickup head track spindle 26, or the mirror spindle 28 is corrected inappropriately or is tilted, a laser beam 30 outputted by the pickup head 18 to the compact disc 14 will not be able to generate an orthogonal incidence (90 degree).

Please refer to FIG. 1 and FIG. 2. FIG. 2 is a schematic diagram of a laser beam 30 inputted to a compact disc 14 shown in FIG. 1. As shown in FIG. 2, the compact disc 14 comprises a plurality of different recording blocks 32. As shown in FIG. 1, the optical information recording/reproducing apparatus 10 may enable the pickup head 18 and the compact disc 14 to maintain a focus distance w1 by the focus servo of the prior art. Also, the laser beam 30 can focus on the specific recording block 32 correctly by cooperating with the tracking servo of the prior art. However, as shown in FIG. 2, the prior art cannot detect and adjust an inclination $\theta 1$ resulted from the laser beam that is not orthogonal. This disadvantage causes lower signal quality while reading or recording the optical information.

Besides the tilt of spindle 22, disc spindle 24, pickup head track spindle 26, and mirror spindle 28 shown in FIG. 1, there is another reason that causes the inclination $\theta 1$; that is, the compact disc 14 is not a smooth but a tilt one.

The inclination $\theta 1$ caused by the tilt of spindle 22, disc spindle 24, pickup head track spindle 26, and mirror spindle 28 does not change when the distance between the recording block 32 and the compact disc 14 is different. The inclination $\theta 1$ is called linear inclination.

On the other hand, because of the different distance between the recorded/reproduced recording block and the center of the compact disc 14, the inclination caused by the tilt compact disc is different. Therefore, this inclination is called non-linear tilt. The position from the center along the radius to where a tilt is generated is called non-linear deformation.

There are presently a few research projects aiming at the problem of the incident angle between the laser beam and the compact disc. Most of the research needs a tilt sensor for detecting the offset of the incident angle between the laser beam and the compact disc. According to the detection result the pickup head is adjusted, and the laser beam may be corrected to be orthogonal to the compact disc. However, the installation of the tilt sensor will increase the cost of production. Therefore, there are only a few optical information recording/reproducing apparatus which currently has the tilt sensor installed.

For this reason, the prior art lacks an auto-adjusting system for an optical incident angle and an auto-adjusting system for an optical incident angle without the tilt sensor, so as to be acceptable under the consideration of cost when producing the optical information recording/reproducing apparatus.

SUMMARY OF THE INVENTION

The objective of the present invention is to provide an auto-adjusting system for an optical incident angle applied in an optical information recording/reproducing apparatus, which is used for correcting the inclination of the pickup head on line, so that the laser beam can be kept in a predetermined optical incident angle to read data from the compact disc, and thus maintaining the optical information recording/reproducing quality.

The other objective of the present invention is to provide an auto-adjusting system for an optical incident angle without a tilt sensor, so as to be acceptable under the consideration of cost when producing the optical information recording/reproducing apparatus.

The present invention provides an auto-adjusting system for an optical incident angle applied in optical information recording/reproducing apparatus. The above optical information recording/reproducing apparatus comprises a pickup head and a tilt actuator. The pickup head generates a laser beam to read data from a recording block of a first radius on a compact disc and receive a focus output voltage from the focus servo (e.g. the focus output voltage may be provided by the focus servo within the controller). The tilt actuator outputs a tilt adjusting signal to correct the inclination of the pickup head, so as to keep the laser beam at a predetermined optical incident angle to read data from the compact disc.

The auto-adjusting system for an optical incident angle comprises a memory, a linear tilt calculation unit, a non-linear tilt calculation unit, and a controller. The memory is used for storing a linear tilt compensation table and a non-linear tilt compensation table. The linear tilt compensation table is built via a predetermined linear tilt adjusting procedure and comprises a plurality of focus output voltages and a plurality of corresponding linear tilt dac values. The non-linear tilt compensation table records a plurality of non-linear tilt compensation parameters. Each non-linear tilt compensation parameter is a function of the first radius and a second radius, wherein the compact disc begins to generate non-linear deformation. The linear tilt calculation unit is used for calculating the corresponding linear tilt dac value by consulting the linear tilt compensation table according to the first radius and the focus output voltage. According to a predetermined comparison procedure, the non-linear tilt calculation unit is used for generating the second radius, wherein the compact disc begins to generate non-linear deformation, and then obtaining the corresponding non-linear tilt compensation parameter by consulting the non-linear tilt compensation table according to the first radius and the second radius. The controller is used for controlling the pickup head, the memory, the linear tilt calculation unit, and the non-linear tilt calculation unit. Wherein the pickup head reads data from the recording block on the compact disc, the controller controls the calculation of a tilt compensation equation by inputting the linear tilt dac value generated by the linear tilt calculation unit and the non-linear tilt compensation parameter generated by the non-linear tilt calculation unit. The controller also enables the tilt actuator to output the corresponding tilt adjusting signal to the pickup head according to the calculation result, so as to adjust the inclination of the pickup head on-line.

Compared with the prior art, the optical information recording/reproducing apparatus doesn't need to install a tilt sensor; it obtains the tilt of the optical incident angle from the laser beam to the compact disc as in the prior art, which utilizes the focus output voltage to keep a focus distance between the pickup head and the compact disc. After calculating and obtaining the tilt of the optical incident angle, the auto-adjusting system for an optical incident angle of the present invention further actuates the inclination of the pickup head, so that the laser beam is parallel to the normal direction of the selected recording block, thus achieving the objective of auto-adjusting for an optical incident angle. Therefore, the optical information recording/reproducing apparatus, which utilizes the auto-adjusting system for an optical incident angle of the present invention, not only can maintain the optical information recording/reproducing quality but is also acceptable under the consideration of cost when producing the optical information recording/reproducing apparatus.

The advantage and spirit of the invention may be understood by the following recitations together with the appended drawings.

BRIEF DESCRIPTION OF THE APPENDED DRAWINGS

DETAILED DESCRIPTION OF THE INVENTION

The present invention provides an auto-adjusting system for an optical incident angle in an optical information recording/reproducing apparatus. The optical information recording/reproducing apparatus of the present invention is able to do away with the use of the tilt sensor of the prior art and can still obtain the optical incident angle to auto-adjust the pickup head, so as to substantially keep the pickup head with the compact disc at the orthogonal position of 90 degree.

Figure 3:
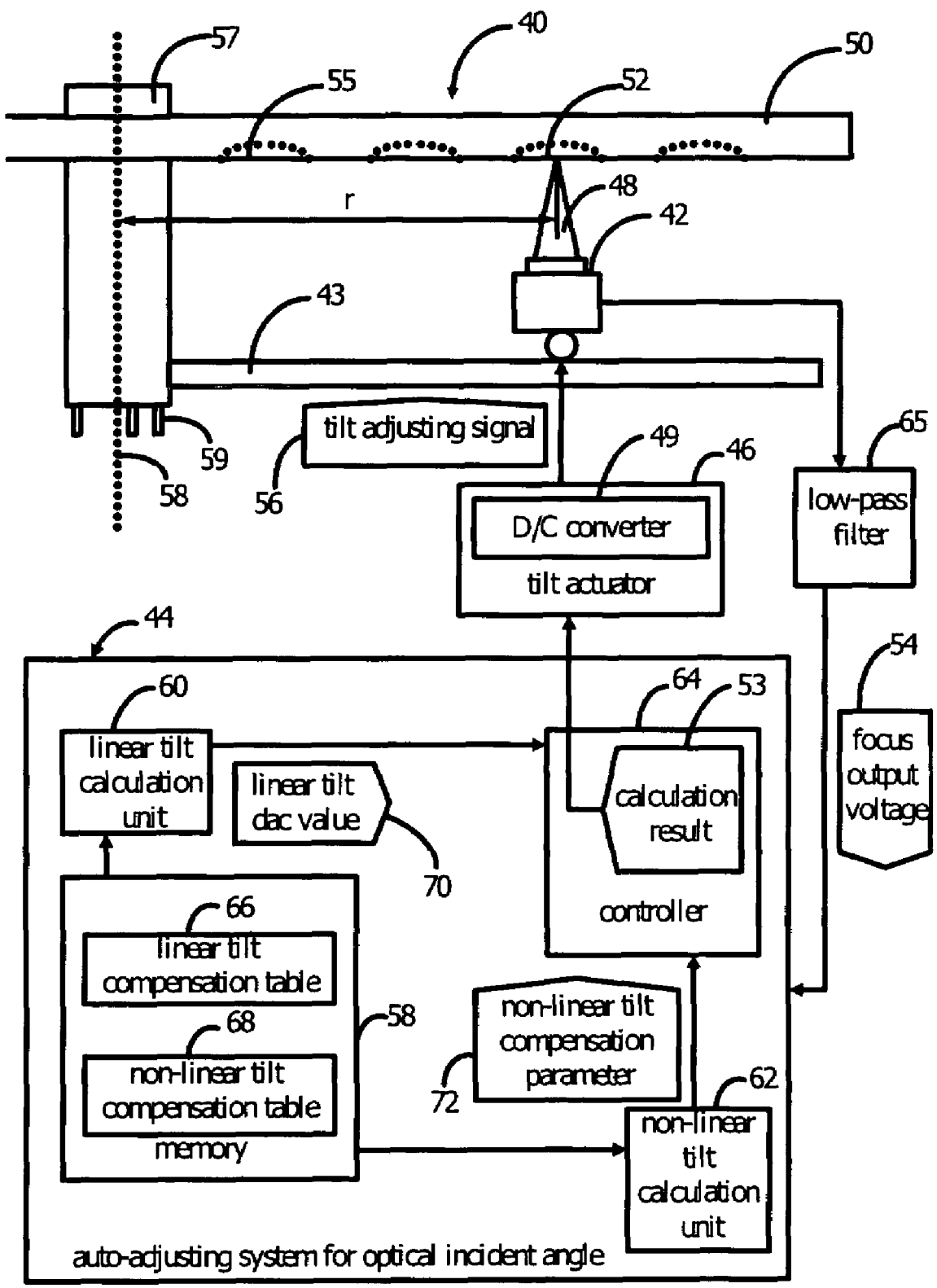
FIG. 3 is a schematic diagram of an optical information recording/reproducing apparatus according to the present invention.

Please refer to FIG. 3. FIG. 3 is a schematic diagram of an optical information recording/reproducing apparatus 40 according to the present invention. The optical information recording/reproducing apparatus 40 comprises a pickup head 42, a pickup head guiding track 43, an auto-adjusting system 44 for an optical incident angle, and a tilt actuator 46. The pickup head 42 generates a laser beam 48 to read data from a recording block 52 of a first radius r on a compact disc 50 and receives a focus output voltage (FOSO) 54 of the focus servo in responsive to the reflected laser beam 48. The tilt actuator 46 outputs a tilt adjusting signal 56 to correct the inclination of the pickup head 42, so as to keep the laser beam 48 at a predetermined optical incident angle to read data from the compact disc 50.

The pickup head 42 comprises a laser diode for generating the laser beam 48 and a photo detector for detecting the laser beam 48 reflected from the recording block.

The compact disc 50 comprises recording blocks. The pickup head track 43 is used for enabling the pickup head 42 to move in parallel to the radial direction of the compact disc 50, in order to read data from recording blocks, which include the recording block 52 with the first radius distance r. The starting position 55 represents the innermost position, which can be used to record/reproduce data, of the compact disc 50.

The optical information recording/reproducing apparatus 40 comprises a spindle 57 for rotating the compact disc 50. There is at least one inclination adjusting screw accommodated on the spindle 57. In this embodiment, there are three inclination adjusting screws 59 accommodated on the spindle 57. The inclination adjusting screws 59 can adjust the inclination of the shaft 58 of the spindle 57 and the horizontal inclination as the compact disc 50 rotates. The function of the three inclination adjusting screws 59 is similar to the inclination adjusting screw 29 of the prior art shown in FIG. 1.

The auto-adjusting system 44 for an optical incident angle of the present invention comprises a memory 58, a linear tilt calculation unit 60, a non-linear tilt calculation unit 62, and a controller 64. The memory is used for storing a linear tilt compensation table 66 and a non-linear tilt compensation table 68.

The linear tilt compensation table 66 is built via a predetermined linear tilt adjusting procedure and comprises a plurality of focus output voltages and a plurality of corresponding linear tilt dac values. The non-linear tilt compensation table 68 records a plurality of non-linear tilt compensation parameters. Each non-linear tilt compensation parameter is a function of the first radius r and a second radius $r_0$ wherein the compact disc 50 begins to generate non-linear deformation.

The linear tilt calculation unit 60 is used for calculating the corresponding linear tilt dac value 70 by consulting the linear tilt compensation table 66 according to the first radius r and the focus output voltage 54 provided by the focus servo.

The non-linear tilt calculation unit 62 is used for generating the second radius $r_0$, wherein the compact disc 50 begins to generate non-linear deformation according to a predetermined comparison procedure, and then obtaining the corresponding non-linear tilt compensation parameter 72 by consulting the non-linear tilt compensation table 68 according to the first radius r and the second radius $r_0$.

The controller 64 is used for controlling the pickup head 42, the memory 58, the linear tilt calculation unit 60, and the non-linear tilt calculation unit 62.

When the pickup head 42 reads data from the recording block 52 on the compact disc 50, the controller 64 controls the calculation of a tilt compensation equation by inputting the linear tilt dac value 70 generated by the linear tilt calculation unit 60 and the non-linear tilt compensation parameter 72 generated by the non-linear tilt calculation unit 62. The controller 64 also enables the tilt actuator 46 to output the corresponding tilt adjusting signal 56 to the pickup head 42 according to the calculation result 53, so as to adjust the inclination of the pickup head 42 on-line when the pickup head moves and works normally (e.g. when the pickup head moves along the top of the compact disc to read data from the compact disc). Taking this embodiment as an example, the controller 64 adjusts the inclination of the pickup head 42 every 200 ms to 500 ms on line.

The controller 64 generates the calculation result 53, defined as Theta, from the following tilt compensation equation:

$$Theta = bLinearTiltDAC + (bLinarTiltDAC - bTiltDAC\_offset) + 2*\beta(bLinarTiltDAC - bTiltDAC\_offset);$$

In the above equation, the linear tilt dac value 70 calculated by the linear tilt calculation unit 60 is defined as bLinearTiltDAC. The linear tilt dac value obtained by the pickup head 42 when reading the start position 55 of the compact disc 50 is defined as bTiltDAC_offset. The non-linear tilt compensation parameter 72 obtained by the non-linear tilt calculation unit 62 is defined as $\beta$.

The tilt actuator 46 comprises a digital to analog (D/A) converter 49 for converting the calculation result 53 of the controller 64 into the corresponding tilt adjusting signal 56 to adjust the inclination of the pickup head 42. The tilt actuator 46 enables the laser beam 48, generated by the pickup head 42, to parallel the normal direction of the selected recording block 52, so that the optical incident angle is substantially kept at 90 degree to reduce the error rate when reading data from the recording block 52. In this embodiment, the frequency that the controller 64 adjusts the inclination of the pickup head 42 on line is once per 200 ms to 500 ms.

As the above description, the linear tilt adjusting procedure used to build the linear tilt compensation table 66 utilizes a standard non-tilt disk, so that the linear tilt adjusting procedure is not affected by non-linear deformation or non-linear tilt that are caused by the tilt compact disc. The linear tilt adjusting procedure builds the linear tilt compensation table by the following steps: place a normal non-tilt disk in the optical information recording/reproducing apparatus 40, adjust the inclination adjusting screw of the spindle 57 to enable the normal non-tilt disk to rotate under different inclination, record the corresponding focus output voltages 54 in several different radius positions under each inclination angle, and obtain the corresponding linear tilt dac values to complete the linear tilt compensation table 66.

Figure 4A:
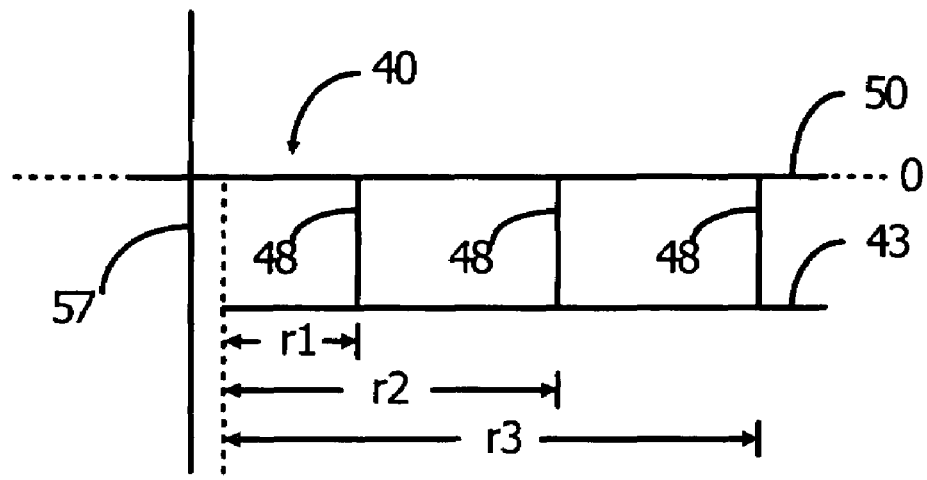
FIG. 4A is a schematic diagram of inclination 0 of the compact disc in the optical information recording/reproducing apparatus shown in FIG. 3.
Figure 4B:
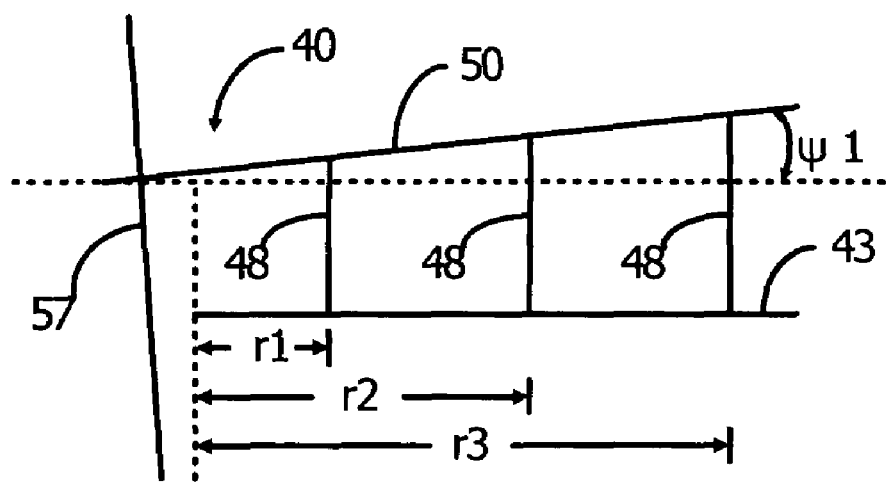
FIG. 4B is a schematic diagram of inclination φ1 of the compact disc in the optical information recording/reproducing apparatus shown in FIG. 3.
Figure 4C:
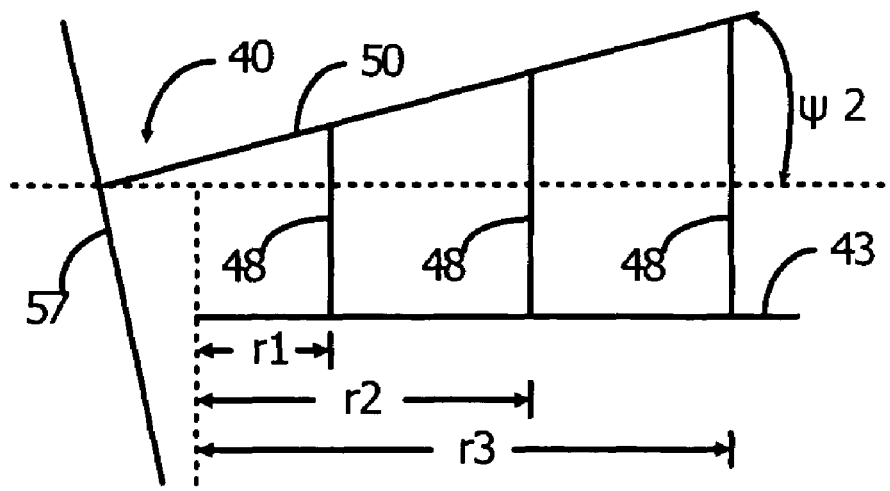
FIG. 4C is a schematic diagram of inclination φ2 of the compact disc in the optical information recording/reproducing apparatus shown in FIG. 3.

Please refer to FIG. 4A to FIG. 4C. FIG. 4A is a schematic diagram of inclination 0 of the compact disc 50 in the optical information recording/reproducing apparatus 40 shown in FIG. 3. FIG. 4B is a schematic diagram of inclination φ1 of the compact disc 50 in the optical information recording/reproducing apparatus 40 shown in FIG. 3. FIG. 4C is a schematic diagram of inclination φ2 of the compact disc 50 in the optical information recording/reproducing apparatus 40 shown in FIG. 3. The following description will describe the method for building the linear tilt compensation table 66 shown in FIG. 3 by the above three diagrams. If more tilts with different inclination are selected, the linear tilt compensation 66 will be more accurate. For the convenience of description, this embodiment only takes the above three diagrams as examples. The tilt adjusting screw 59 of the spindle 57 may be adjusted to enable the compact disc 50 to rotate at different inclination 0, φ1, and φ2, as shown in FIG. 4A, FIG. 4B, and FIG. 4C respectively.

As shown in FIG. 4A, FIG. 4B, and FIG. 4C, the pick up head 42 receives corresponding focus output voltages 54, that are obtained after filtration via a low-pass filter 65, at different radius distances, such as inner position $r_1$, middle position $r_2$, and outer position $r_3$ respectively. The linear tilt compensation table 66 can be obtained by recording the focus output voltages 54.

Figure 5:
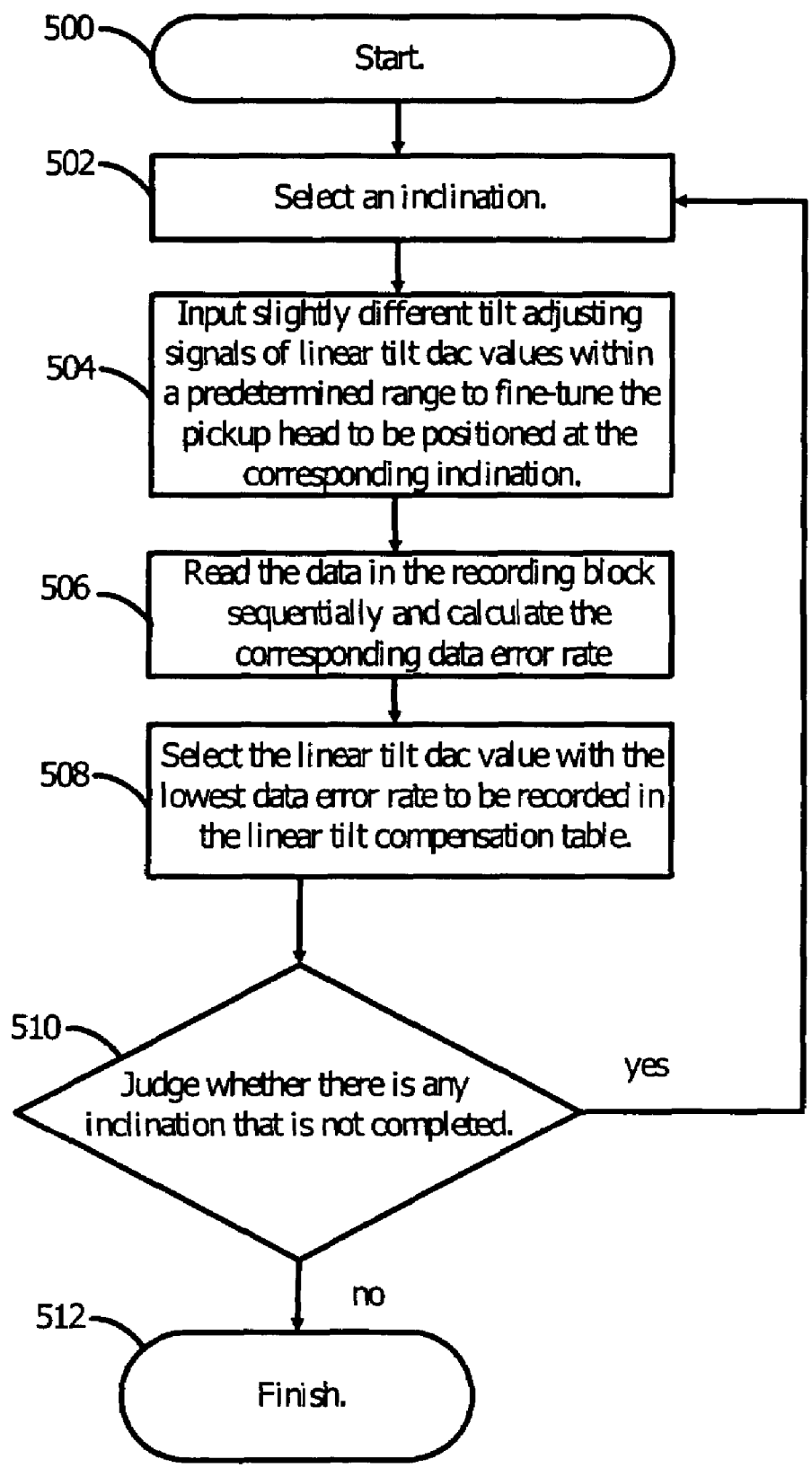
FIG. 5 is a flowchart of building the tilt dac values of the linear tilt compensation table shown in FIG. 3.

Please refer to FIG. 5. FIG. 5 is a flowchart of building the tilt dac values of the linear tilt compensation table 66 shown in FIG. 3. In the auto-adjusting system for an optical incident angle of the present invention, the linear tilt dac values recorded in the linear tilt compensation table 66 are obtained by the following steps:

Step 500: Start.
Step 502: Select an inclination.
Step 504: Input slightly different tilt adjusting signals 56 of linear tilt dac values within a predetermined range to fine-tune the pickup head 42 to be positioned at the corresponding inclination.
Step 506: Read the data in the recording block 52 sequentially, and calculate the corresponding data error rate.
Step 508: Select the linear tilt dac value with the lowest data error rate to be recorded in the linear tilt compensation table 66.
Step 510: Judge whether there is any inclination that is not completed. If yes, go to step 500, or go to step 512.
Step 512: Finish.

In other words, the method, which obtains these linear tilt dac values, is to select different inclination angles and repeat step 504 to step 508 until all linear tilt dac values in the linear tilt compensation table 66 are all recorded.

Figure 1:
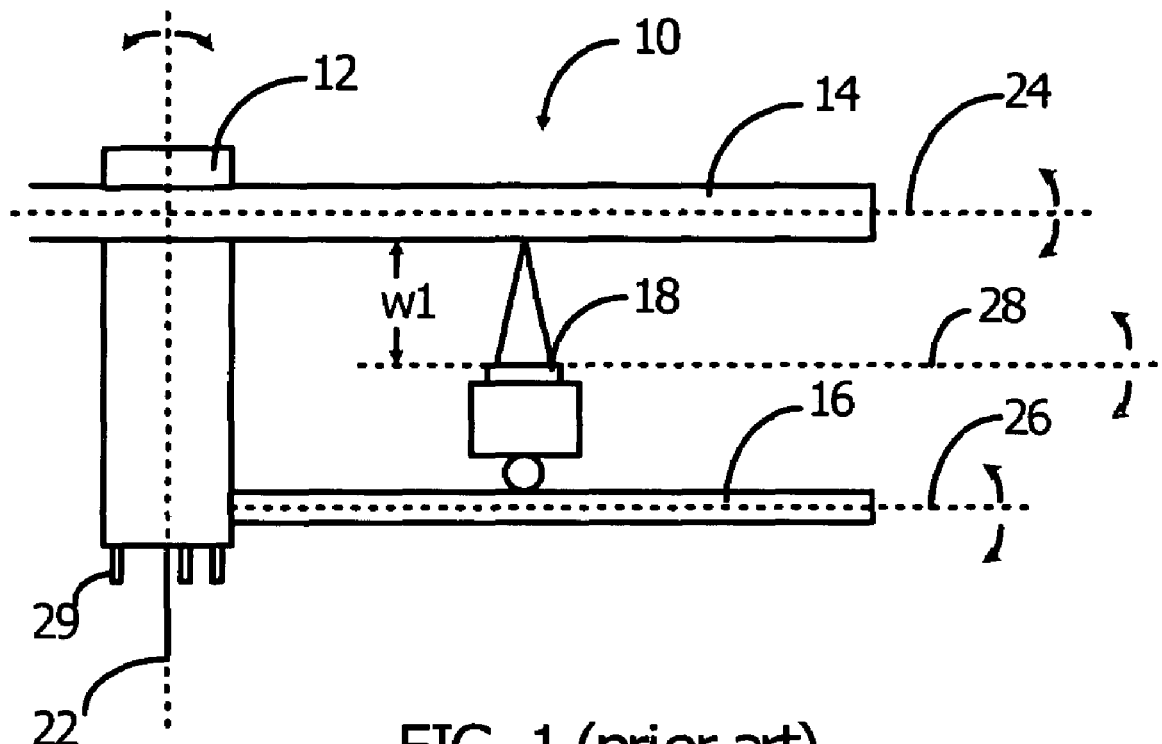
FIG. 1 is a schematic diagram of the relative position between an optical information recording/reproducing apparatus and an optical disc of the prior art.
Figure 2:
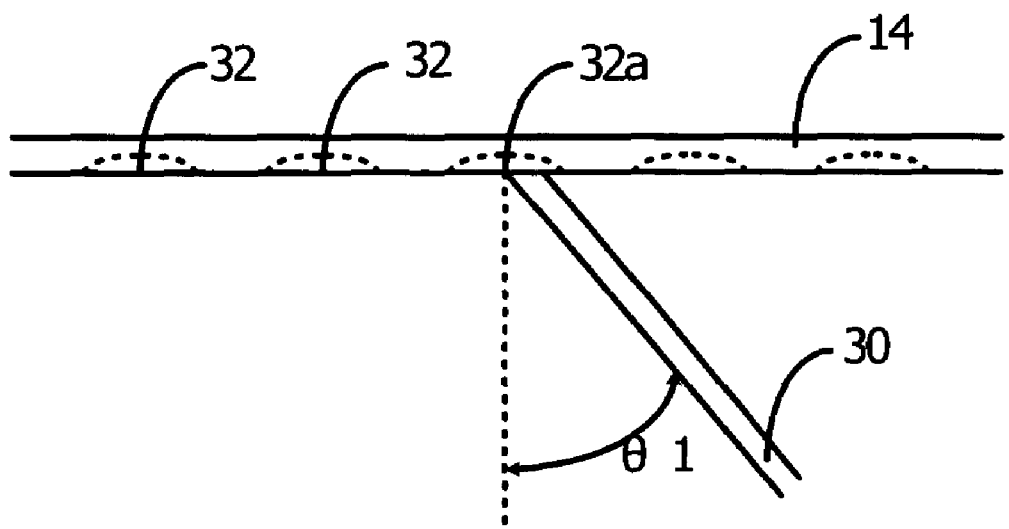
FIG. 2 is a schematic diagram of a laser beam inputted to a compact disc shown in FIG. 1.

Please refer to FIG. 1 and FIG. 2. The inclination θ1 caused by the tilt of spindle 22, disc spindle 24, pickup head track spindle 26, and mirror spindle 28 is called linear inclination. The optical information recording/reproducing apparatus 40 will have the ability to process these kinds of linear inclinations by the linear tilt compensation table 66.

However, with non-linear inclination caused by the tilt compact disc, the non-linear tilt compensation table 68 shown in FIG. 3 is necessary, so that the optical information recording/reproducing apparatus 40 can utilizes the controller 64 to adjust the inclination of the pickup head 42.

Figure 6:
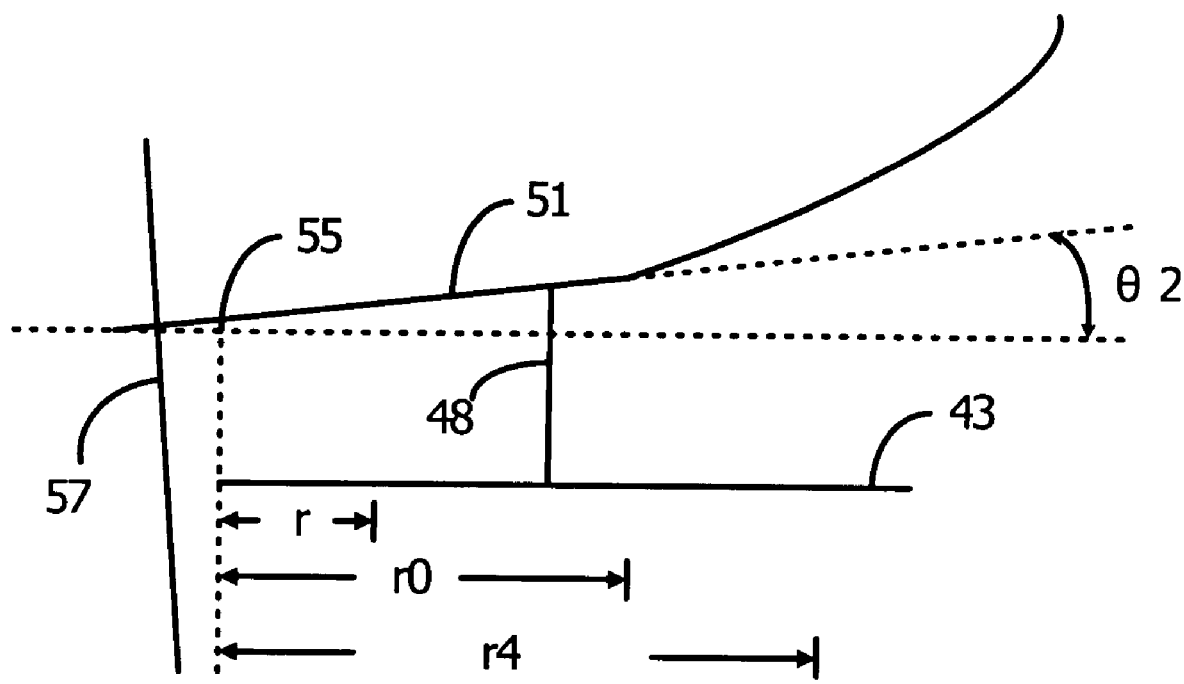
FIG. 6 is a schematic diagram of a tilt compact disc used by the optical information recording/reproducing apparatus shown in FIG. 3.

Please refer to FIG. 6. FIG. 6 is a schematic diagram of a tilt compact disc 51 used by the optical information recording/reproducing apparatus 40 shown in FIG. 3. The tilt compact disc 51 begins to generate non-linear deformation at the position of the second radius distance $r_0$ away from the center. Taking the radius r shown in FIG. 6 as an example, the tilt of any radius distance between the center and $r_0$ is a linear tilt angle $\theta_2$, and the tilt of any radius distance $r_4$ larger than $r_0$ is a non-linear tilt angle. The present invention obtains the non-linear tilt compensation parameters β via the following equation after obtaining the position where the tilt compact disc 51 begins to generate second radius distance $r_0$ and cooperating with first radius distance r and linear tilt angle $\theta_2$.

$$\beta = \frac{SIN^{-1}\left(\left(\frac{r}{r-r_0}\right)*SIN\theta_2\right) - \theta_2}{\theta_2}$$

Wherein $\theta_2$ is first being kept constant, the non-linear tilt compensation parameters β in the non-linear tilt compensation table 68 are obtained by changing r and $r_0$; $\theta_2$ is then being changed, and the above method is repeated to build the non-linear tilt compensation table 68.

Figure 7:
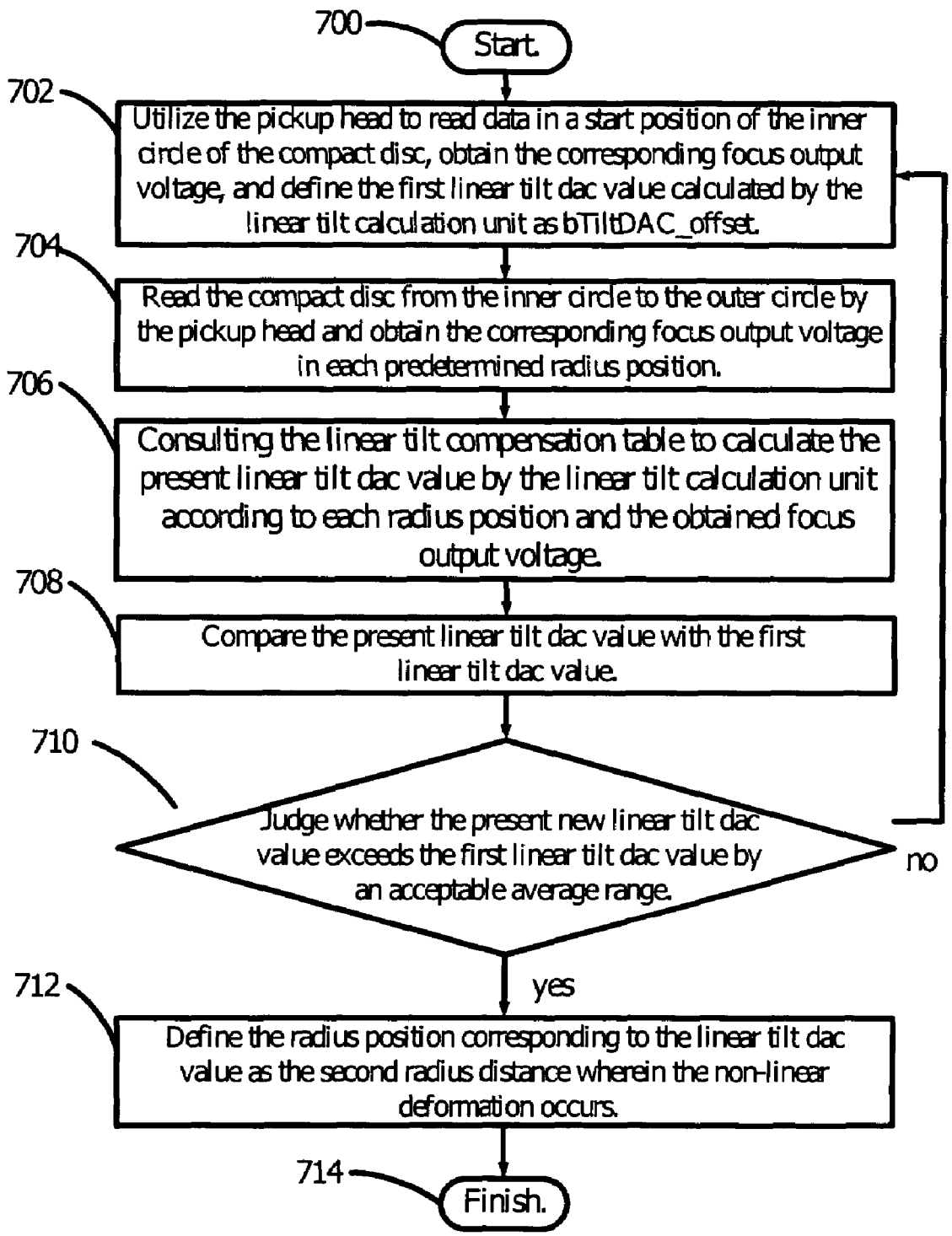
FIG. 7 is a flowchart of comparison procedure of generating second radius distance $r_0$ as shown in FIG. 6.

Please refer to FIG. 3, FIG. 6, and FIG. 7. FIG. 7 is a flowchart of comparison procedure of generating second radius distance $r_0$ as shown in FIG. 6. According to the predetermined comparison procedure shown in FIG. 7, the non-linear tilt calculation unit 62 shown in FIG. 3 obtains the second radius distance $r_0$ where the tilt compact disc 51 begins to generate non-linear deformation shown in FIG. 6. The predetermined comparison procedure comprises the following steps:

Step 700: Start.
Step 702: Utilize the pickup head 42 to read data in a start position 55 of the inner circle of the compact disc 42, obtain the corresponding focus output voltage 54, and define the first linear tilt dac value calculated by the linear tilt calculation unit 60 as bTiltDAC_offset.
Step 704: Read the compact disc 50 from the inner circle to the outer circle by the pickup head 42, and obtain the corresponding focus output voltages in each predetermined radius position.
Step 706: Consulting the linear tilt compensation table to calculate the present linear tilt dac values 70 by the linear tilt calculation unit 60, according to each radius position and the obtained focus output voltage.
Step 708: Compare the present linear tilt dac value 70 with the first linear tilt dac value.
Step 710: Judge whether the present new linear tilt dac value exceeds the first linear tilt dac value by an acceptable average range. If yes, go to step 712, or go to step 704.
Step 712: Define the radius position corresponding to the linear tilt dac value as the second radius distance $r_0$ wherein the non-linear deformation occurs.
Step 714: Finish.

By building the linear tilt compensation table 66 and the non-linear tilt compensation table 68, the auto-adjusting system 44 for an optical incident angle can calculate the inclination of optical incident angle from the laser beam 48 to the compact disc 50.

Compared with the prior art, the optical information recording/reproducing apparatus 40 doesn't need to install a tilt sensor; it obtains the tilt of the optical incident angle from the laser beam 48 to the compact disc 50 by the prior art, which utilizes the focus output voltage 54 to keep a focus distance between the pickup head 42 and the compact disc 50. After calculating and obtaining the tilt of the optical incident angle, the auto-adjusting system 44 for an optical incident angle of the present invention further actuates the inclination of the pickup head 42, so that the laser beam 48 is parallel to the normal direction of the selected recording block 52, thus achieving the objective of auto-adjusting for an optical incident angle. Therefore, the optical information recording/reproducing apparatus, which utilizes the auto-adjusting system 44 for an optical incident angle of the present invention, not only can maintain the optical information recording/reproducing quality but is also acceptable under the consideration of cost when producing the optical information recording/reproducing apparatus.

With the example and explanations above, the features and spirits of the invention will be hopefully well described.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An auto-adjusting system for an optical incident angle in an optical information recording/reproducing apparatus, the optical information recording/reproducing apparatus comprising a pickup head and a tilt actuator, the pickup head generating a laser beam to read data from a recording block of a first radius on a compact disc and receive a focus output voltage (FOSO) in responsive to the reflected laser beam, the tilt actuator outputting a tilt adjusting signal to correct the inclination of the pickup head, so as to keep the laser beam at a predetermined optical incident angle to read data from the compact disc, the auto-adjusting system comprising:

a memory for storing a linear tilt compensation table and a non-linear tilt compensation table, the linear tilt compensation table being built via a predetermined linear tilt adjusting procedure and comprising a plurality of focus output voltages and a plurality of corresponding linear tilt dac values, the non-linear tilt compensation table recording a plurality of non-linear tilt compensation parameters, each non-linear tilt compensation parameter being a function of the first radius and a second radius wherein the compact disc begins to generate non-linear deformation;

a linear tilt calculation unit, for calculating the corresponding linear tilt dac value by consulting the linear tilt compensation table according to the first radius and the focus output voltage;

a non-linear tilt calculation unit, for generating the second radius wherein the compact disc begins to generate non-linear deformation according to a predetermined comparison procedure, and then obtaining the corresponding non-linear tilt compensation parameter by consulting the non-linear tilt compensation table according to the first radius and the second radius; and a controller for controlling the pickup head, the memory, the linear tilt calculation unit, and the non-linear tilt calculation unit;

wherein, when the pickup head reads data from the recording block on the compact disc, the controller controls the calculation of a tilt compensation equation by inputting the linear tilt dac value generated by the linear tilt calculation unit and the non-linear tilt compensation parameter generated by the non-linear tilt calculation unit, and enables the tilt actuator to output the corresponding tilt adjusting signal to the pickup head according to the calculation result, so as to on-line adjust the inclination of the pickup head.

2. The auto-adjusting system of claim 1, wherein the pickup head comprises a laser diode for generating the laser beam and a photo detector for detecting the laser beam reflected from the recording block, and the tilt actuator comprises a digital to analog (D/A) converter for converting the calculation result of the controller into the corresponding tilt adjusting signal to adjust the inclination of the pickup head.

3. The auto-adjusting system of claim 1, wherein the tilt actuator enables the laser beam generated by the pickup head to parallel the normal direction of the selected recording block, so that the predetermined optical incident angle is substantially kept at 90 degree to reduce the error rate when reading data from the recording block.

4. The auto-adjusting system of claim 1, wherein the optical information recording/reproducing apparatus comprises a spindle for rotating the compact disc, and there is at least one inclination adjusting screw accommodated on the spindle for adjusting the horizontal inclination as the compact disc rotates.

5. The auto-adjusting system of claim 4, wherein the linear tilt adjusting procedure builds the linear tilt compensation table by the following steps:

placing a normal non-tilt disk in the optical information recording/reproducing apparatus;

adjusting the inclination adjusting screw to enable the normal non-tilt disk to rotate under different inclination; and recording the corresponding focus output voltages in several different radius positions under each inclination angle, and obtaining the corresponding linear tilt dac values to complete the linear tilt compensation table.

6. The auto-adjusting system of claim 5, wherein the linear tilt dac values recorded in the linear tilt compensation table are obtained by the following steps:

for a given inclination angle, inputting slightly different tilt adjusting signals within a predetermined range to fine tune the pickup head to be positioned at the corresponding inclination angle;

reading the data in the recording block sequentially, identifying the corresponding data error rate, and selecting the linear tilt dac value with the lowest data error rate to be recorded in the linear tilt compensation table; and selecting different inclination angles and repeating the above two steps until all linear tilt dac values in the linear tilt compensation table are all recorded.

7. The auto-adjusting system of claim 1, wherein the focus output voltages recorded in the linear tilt compensation table are the received focus output voltages when the pickup head is positioned at an inner circle, a middle circle, and an outer circle respectively, and the focus output voltages are obtained after filtration via a low-pass filter.

8. The auto-adjusting system of claim 1, wherein the comparison procedure comprises the following steps:

utilizing the pickup head to read data in a start position of the inner circle of the compact disc, obtaining the corresponding focus output voltage, and then generating a first linear tilt dac value calculated by the linear tilt calculation unit; reading the compact disc from the inner circle to the outer circle by the pickup head, obtaining the corresponding focus output voltages in different radius positions, and generating the corresponding linear tilt dac values calculated by the linear tilt calculation unit at different radius positions; and comparing the present linear tilt dac value calculated by the linear tilt calculation unit with the first linear tilt dac value, and if the present linear tilt dac value exceeds the first linear tilt dac value by an acceptable average range, defining the corresponding radius position as the second radius wherein the non-linear deformation occurs.

9. The auto-adjusting system of claim 8, wherein the first radius is defined as r, the second radius is defined as $r_0$, the linear tilt angle of the compact disc is defined as $\theta_2$, and the non-linear tilt compensation parameter is defined as $\beta$ and is obtained by the following equation:

$$\beta = \frac{\mathrm{SIN}^{-1}\left(\left(\frac{r}{r-r_0}\right)*\mathrm{SIN}\theta_2\right) - \theta_2}{\theta_2}$$

wherein the non-linear tilt compensation parameters β in the non-linear tilt compensation table are obtained by fixing $\theta_2$ and changing r and $r_0$.

10. The auto-adjusting system of claim 9, wherein the linear tilt dac value calculated by the linear tilt calculation unit is defined as bLinearTiltDAC, the first linear tilt dac value obtained by the pickup head when reading the start position of the compact disc is defined as bTiltDAC_offset, the non-linear tilt compensation parameter obtained by the non-linear tilt calculation unit is defined as β, and the controller generates the calculation result defined as Theta from the following tilt compensation equation:

$$Theta = bLinearTiltDAC + (bLinearTiltDAC - bTiltDAC\_offset) + 2*\beta*(bLinearTiltDAC - bTiltDAC\_offset)$$

11. The auto-adjusting system of claim 1, wherein the controller adjusts the inclination of the pickup head every 200 ms to 500 ms.

12. The auto-adjusting system of claim 1, wherein if the pickup head is not positioned at any one predetermined radius in the non-linear tilt compensation table, the controller calculates the corresponding linear tilt dac value by interpolation.

* * * * *